US012645664B2

(12) United States Patent　　　　(10) Patent No.:　US 12,645,664 B2
Yadala et al.　　　　　　　　　　　(45) Date of Patent:　　Jun. 2, 2026

(54) AUTOMATED FAILOVER FOR A PAIRED SET OF CONSISTENCY GROUPS WHILE STORAGE EXPANSION OCCURS WITHIN A CROSS-SITE STORAGE SYSTEM

(71) Applicant: NetApp, Inc., San Jose, CA (US)

(72) Inventors: V Ramakrishna Rao Yadala, Karnataka (IN); Sohan Shetty, Bangalore (IN); Akhil Kaushik, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/489,597

(22) Filed: Oct. 18, 2023

(65) Prior Publication Data

US 2025/0130985 A1　　Apr. 24, 2025

(51) Int. Cl.
　　G06F 16/20　　　(2019.01)
　　G06F 16/23　　　(2019.01)
　　G06F 16/27　　　(2019.01)

(52) U.S. Cl.
　　CPC .......... G06F 16/2365 (2019.01); G06F 16/27 (2019.01)

(58) Field of Classification Search
　　CPC .............................. G06F 16/2365; G06F 16/27
　　See application file for complete search history.

(56) References Cited

U.S. PATENT DOCUMENTS 9,043,567 B1 *　5/2015　Modukuri ............... G06F 3/067
　　　　　　　　　　　　　　　　　　　711/162
10,481,963 B1　11/2019　Walker 2007/0283089 A1　12/2007　Tsurudome
2022/0067060 A1　　3/2022　O'Halloran et al.
2022/0317882 A1　10/2022　Vijayan et al.
2022/0317897 A1 *　10/2022　Subramanian .......... G06F 3/065
2025/0130733 A1　　4/2025　Yadala et al.

OTHER PUBLICATIONS

Non Final Office Action mailed on Jun. 4, 2025 for U.S. Appl. No. 18/489,610, filed Oct. 18, 2023, 16 pages.
Notice of Allowance mailed on Apr. 10, 2026 for U.S. Appl. No. 18/489,610, filed Oct. 18, 2023, 05 pages.
Final Office Action mailed on Dec. 22, 2025 for U.S. Appl. No. 18/489,610, filed Oct. 18, 2023, 22 pages.

* cited by examiner

*Primary Examiner* — Kristopher Andersen
(74) *Attorney, Agent, or Firm* — Jaffery Watson Hamilton & DeSanctis LLP

(57)　　　　　　ABSTRACT

A computer implemented method includes maintaining information indicative of whether a data replication relationship between a dataset associated with the local CG (CG1) and a mirror copy of the dataset stored on a remote CG (CG2) of a remote distributed storage system is in an in-synchronization (InSync) state or an out-of-synchronization (OOS) state, determining whether a CG storage expansion process is in progress, and in response to determining the OOS state and whether the primary storage site has a failure, initiating an automatic unplanned failover (AUFO) workflow without manual intervention on the original volumes in the CG1 of a first storage cluster of the primary storage site and the original volumes in the CG2 of a second storage cluster when the CG storage expansion process is in progress with a new source volume to be a member of CG1 and a new destination volume to be a member of CG2.

20 Claims, 15 Drawing Sheets

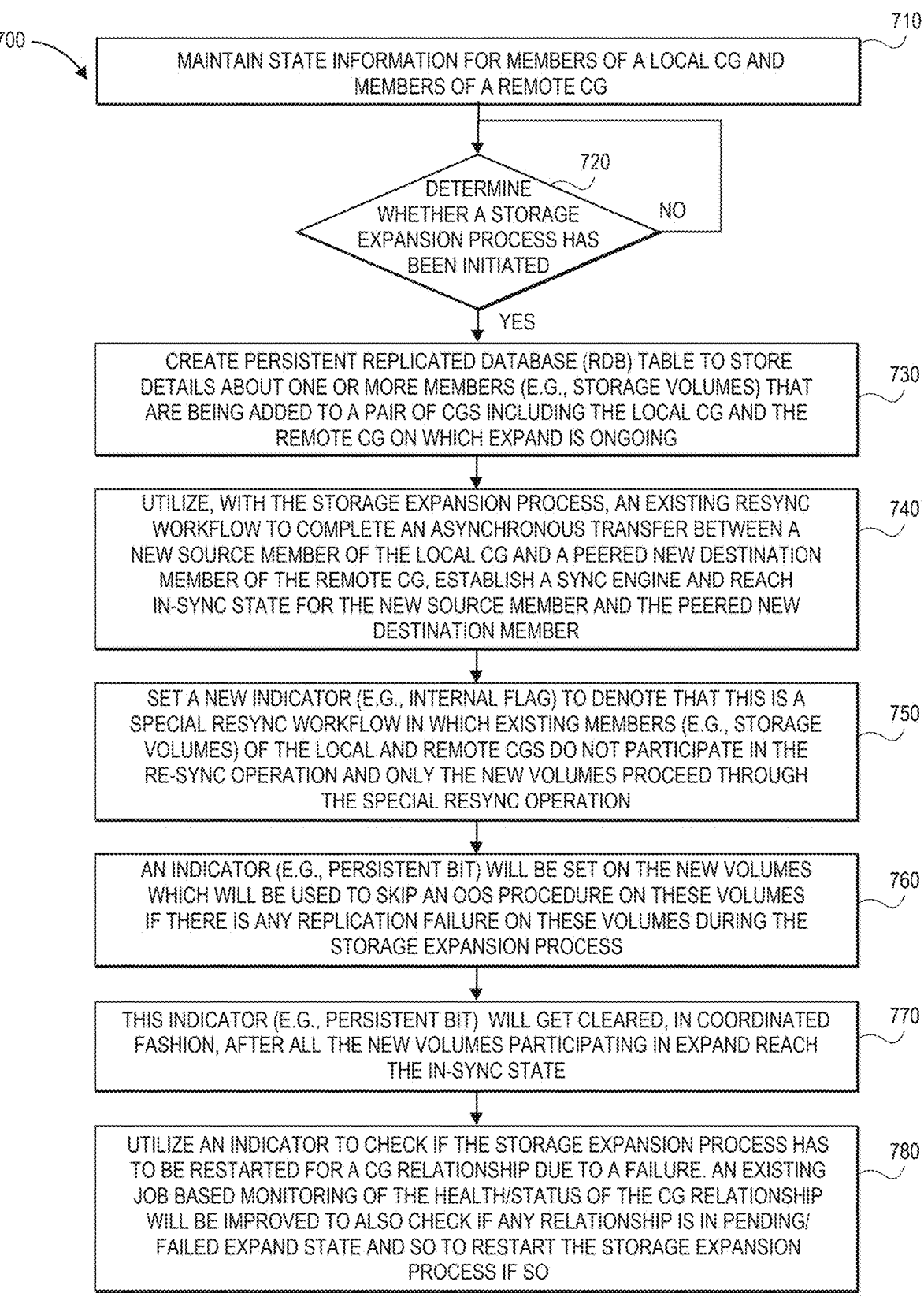

700

710
MAINTAIN STATE INFORMATION FOR MEMBERS OF A LOCAL CG AND MEMBERS OF A REMOTE CG

720
DETERMINE WHETHER A STORAGE EXPANSION PROCESS HAS BEEN INITIATED — NO

YES

730
CREATE PERSISTENT REPLICATED DATABASE (RDB) TABLE TO STORE DETAILS ABOUT ONE OR MORE MEMBERS (E.G., STORAGE VOLUMES) THAT ARE BEING ADDED TO A PAIR OF CGS INCLUDING THE LOCAL CG AND THE REMOTE CG ON WHICH EXPAND IS ONGOING

740
UTILIZE, WITH THE STORAGE EXPANSION PROCESS, AN EXISTING RESYNC WORKFLOW TO COMPLETE AN ASYNCHRONOUS TRANSFER BETWEEN A NEW SOURCE MEMBER OF THE LOCAL CG AND A PEERED NEW DESTINATION MEMBER OF THE REMOTE CG, ESTABLISH A SYNC ENGINE AND REACH IN-SYNC STATE FOR THE NEW SOURCE MEMBER AND THE PEERED NEW DESTINATION MEMBER

750
SET A NEW INDICATOR (E.G., INTERNAL FLAG) TO DENOTE THAT THIS IS A SPECIAL RESYNC WORKFLOW IN WHICH EXISTING MEMBERS (E.G., STORAGE VOLUMES) OF THE LOCAL AND REMOTE CGS DO NOT PARTICIPATE IN THE RE-SYNC OPERATION AND ONLY THE NEW VOLUMES PROCEED THROUGH THE SPECIAL RESYNC OPERATION

760
AN INDICATOR (E.G., PERSISTENT BIT) WILL BE SET ON THE NEW VOLUMES WHICH WILL BE USED TO SKIP AN OOS PROCEDURE ON THESE VOLUMES IF THERE IS ANY REPLICATION FAILURE ON THESE VOLUMES DURING THE STORAGE EXPANSION PROCESS

770
THIS INDICATOR (E.G., PERSISTENT BIT) WILL GET CLEARED, IN COORDINATED FASHION, AFTER ALL THE NEW VOLUMES PARTICIPATING IN EXPAND REACH THE IN-SYNC STATE

780
UTILIZE AN INDICATOR TO CHECK IF THE STORAGE EXPANSION PROCESS HAS TO BE RESTARTED FOR A CG RELATIONSHIP DUE TO A FAILURE. AN EXISTING JOB BASED MONITORING OF THE HEALTH/STATUS OF THE CG RELATIONSHIP WILL BE IMPROVED TO ALSO CHECK IF ANY RELATIONSHIP IS IN PENDING/ FAILED EXPAND STATE AND SO TO RESTART THE STORAGE EXPANSION PROCESS IF SO

REPLICATE, WITH A COMMUNICATION CHANNEL, THE PRIMARY COPY OF THE DATA OF THE MEMBERS (E.G., ORIGINAL SOURCE VOLUMES OF CG1) OF THE FIRST CLUSTER OF THE PRIMARY STORAGE SITE TO THE SECONDARY COPY OF THE DATA IN THE MEMBERS (E.G., ORIGINAL DESTINATION VOLUMES OF CG2) OF THE SECOND CLUSTER OF THE SECONDARY STORAGE SITE FOR A DATA REPLICATION RELATIONSHIP (OR RELATIONSHIP) BETWEEN THE FIRST AND SECOND CLUSTERS    1110

INITIATE A STORAGE EXPANSION PROCESS INCLUDING A SOURCE EXPANSION TO CREATE A NEW SOURCE VOLUME AS A MEMBER OF THE CG1 AND A DESTINATION EXPANSION OF THE STORAGE EXPANSION PROCESS TO CREATE A NEW DESTINATION VOLUME AS A MEMBER OF THE CG2    1115

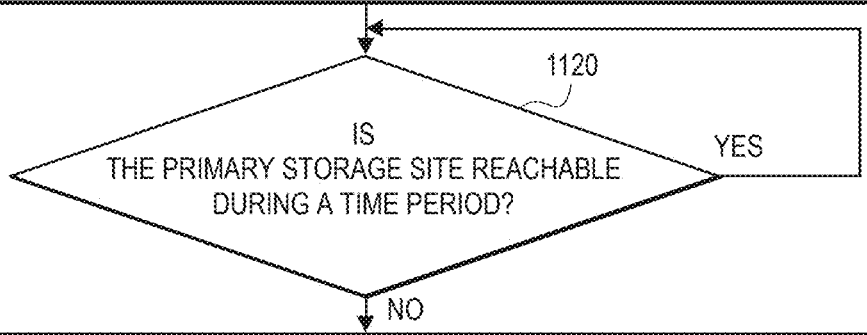

1120

IS THE PRIMARY STORAGE SITE REACHABLE DURING A TIME PERIOD?

YES

NO

THE FIRST CLUSTER OR PRIMARY STORAGE SITE IS CONSIDERED TO BE NON-OPERATIONAL (OR POTENTIALLY NON-OPERATIONAL) AND THE COMPUTER-IMPLEMENTED METHOD INCLUDES INITIATING AN AN AUTOMATIC UNPLANNED FAILOVER (AUFO) ON THE CG2 OF SECOND CLUSTER.    1130

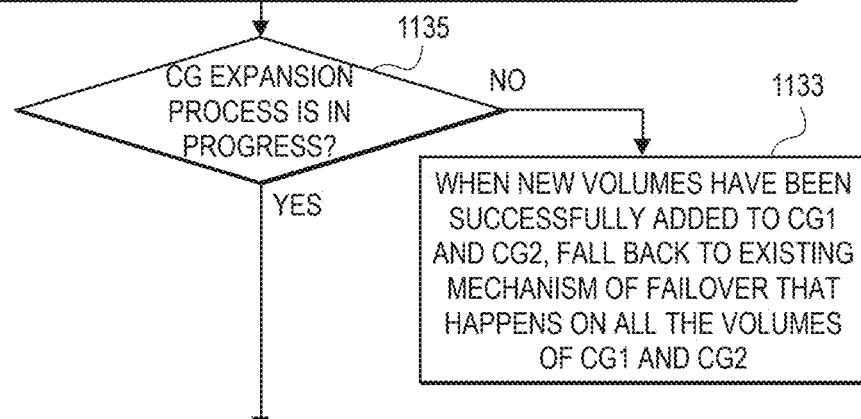

1135

CG EXPANSION PROCESS IS IN PROGRESS?

NO

1133

WHEN NEW VOLUMES HAVE BEEN SUCCESSFULLY ADDED TO CG1 AND CG2, FALL BACK TO EXISTING MECHANISM OF FAILOVER THAT HAPPENS ON ALL THE VOLUMES OF CG1 AND CG2

YES

FOR IN PROGRESS EXPANSION, SET AN INDICATOR (E.G., PERSISTENT RAID FLAG) ON ANY NEW VOLUMES BEING ADDED TO CG1 OR CG2 DURING THE EXPANSION PROCESS    1140

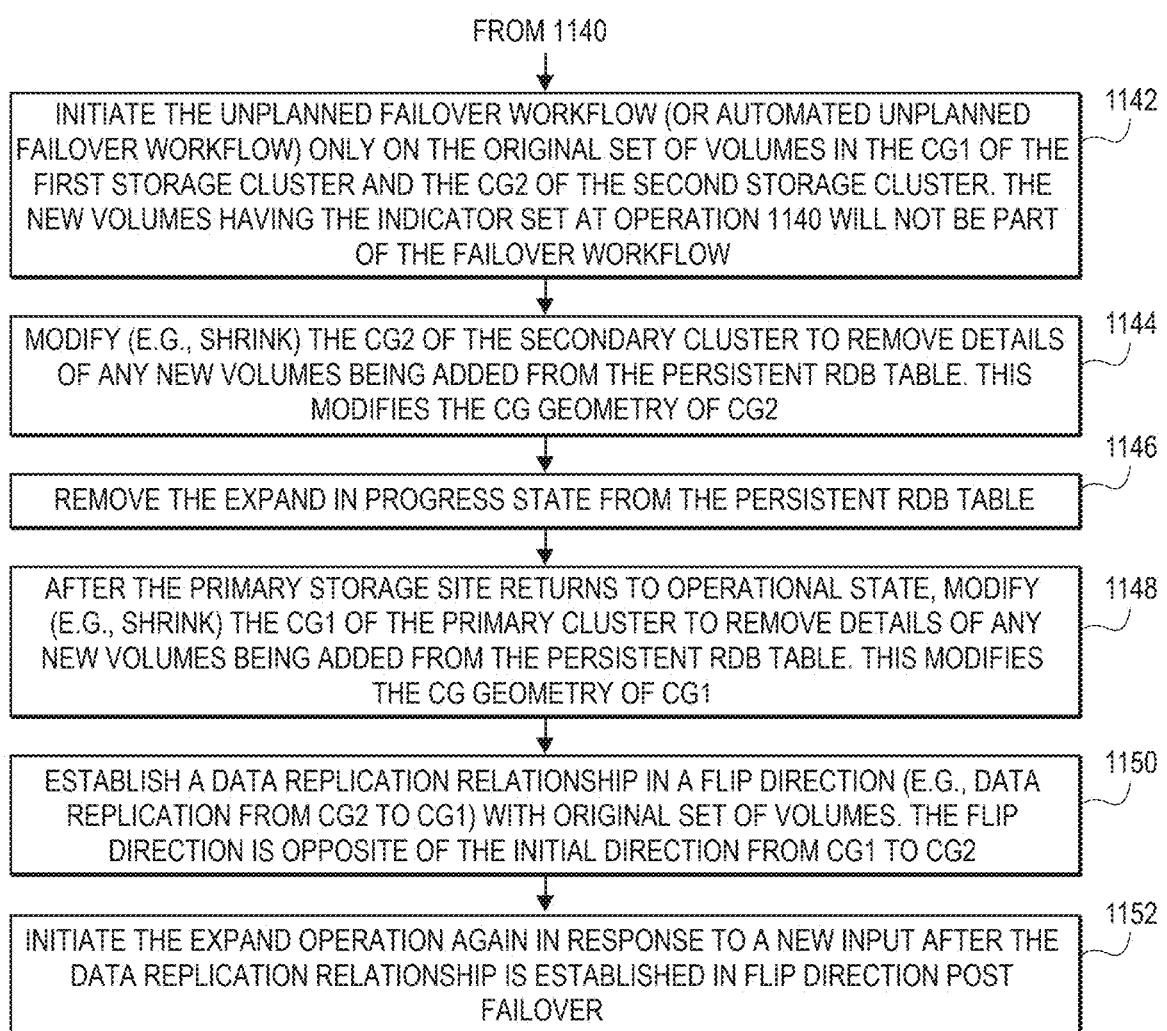

FROM 1140

INITIATE THE UNPLANNED FAILOVER WORKFLOW (OR AUTOMATED UNPLANNED FAILOVER WORKFLOW) ONLY ON THE ORIGINAL SET OF VOLUMES IN THE CG1 OF THE FIRST STORAGE CLUSTER AND THE CG2 OF THE SECOND STORAGE CLUSTER. THE NEW VOLUMES HAVING THE INDICATOR SET AT OPERATION 1140 WILL NOT BE PART OF THE FAILOVER WORKFLOW — 1142

MODIFY (E.G., SHRINK) THE CG2 OF THE SECONDARY CLUSTER TO REMOVE DETAILS OF ANY NEW VOLUMES BEING ADDED FROM THE PERSISTENT RDB TABLE. THIS MODIFIES THE CG GEOMETRY OF CG2 — 1144

REMOVE THE EXPAND IN PROGRESS STATE FROM THE PERSISTENT RDB TABLE — 1146

AFTER THE PRIMARY STORAGE SITE RETURNS TO OPERATIONAL STATE, MODIFY (E.G., SHRINK) THE CG1 OF THE PRIMARY CLUSTER TO REMOVE DETAILS OF ANY NEW VOLUMES BEING ADDED FROM THE PERSISTENT RDB TABLE. THIS MODIFIES THE CG GEOMETRY OF CG1 — 1148

ESTABLISH A DATA REPLICATION RELATIONSHIP IN A FLIP DIRECTION (E.G., DATA REPLICATION FROM CG2 TO CG1) WITH ORIGINAL SET OF VOLUMES. THE FLIP DIRECTION IS OPPOSITE OF THE INITIAL DIRECTION FROM CG1 TO CG2 — 1150

INITIATE THE EXPAND OPERATION AGAIN IN RESPONSE TO A NEW INPUT AFTER THE DATA REPLICATION RELATIONSHIP IS ESTABLISHED IN FLIP DIRECTION POST FAILOVER — 1152

FIG. 11B

AUTOMATED FAILOVER FOR A PAIRED SET OF CONSISTENCY GROUPS WHILE STORAGE EXPANSION OCCURS WITHIN A CROSS-SITE STORAGE SYSTEM

FIELD

Various embodiments of the present disclosure generally relate to multi-site distributed data storage systems. In particular, some embodiments relate to an automated failover for a paired set of consistency groups while non-disruptive storage expansion of the paired set of consistency groups (CG) occurs within cross-site storage solutions (e.g., cross-site high-availability (HA) storage solutions).

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

For various use cases, for example, involving data protection and data migration, it is desirable to efficiently and effectively manage a unit of storage objects/volumes as a single unit (e.g., as a consistency group); however, in other scenarios, it may be advantageous to independently attempt operations between a pair of peered volumes.

SUMMARY

Systems and methods are described for adding a new member (e.g., storage volume), adding an existing empty member, or adding an existing non-empty member to an existing synchronous data replication relationship between a CG of a primary storage site and a paired CG of a secondary storage site (e.g., peered CG of the secondary storage site). A computer implemented method performed by one or more processing resources of a distributed storage system comprises for each of a plurality of original volumes of the distributed storage system that are members of a local consistency group (CG), maintaining information indicative of whether a data replication relationship between a dataset associated with the local CG and a mirror copy of the dataset stored on a corresponding plurality of original volumes that are members of a remote CG of a remote distributed storage system is in an in-synchronization (InSync) state or an out-of-synchronization (OOS) state; initiating a storage expansion process including a source expansion to create a new source volume as a member of the local CG and a destination expansion to create a new destination volume as a member of the remote CG; and initiating a data replication relationship expand to establish a data replication relationship for the new source volume and the new destination volume while maintaining zero RPO and Zero RTO for the data replication relationship of the members of the local CG and remote CG.

In another example, a computer implemented method is performed by one or more processing resources of a distributed storage system. The method comprises for each of a plurality of original volumes of a primary storage site of the distributed storage system that are members of a local consistency group (CG1), maintaining information indicative of whether a data replication relationship between a dataset associated with the CG1 and a mirror copy of the dataset stored on a corresponding plurality of original volumes that are members of a remote CG (CG2) of a remote distributed storage system is in an in-synchronization (In-Sync) state or an out-of-synchronization (OOS) state, determining whether a CG storage expansion process is in progress, determining the OOS state for the data replication relationship between original volumes of the local CG and original volumes of the remote CG and in response to determining the OOS state and whether the primary storage site has a failure, initiating a dependent write order consistent automatic unplanned failover (AUFO) workflow without manual intervention on the original volumes in the CG1 of a first storage cluster of the primary storage site and the original volumes in the CG2 of a second storage cluster when the CG storage expansion process is in progress with a new source volume to be a member of CG1 and a new destination volume to be a member of CG2. In one example, initiating the AUFO workflow is performed without manual intervention (e.g., no user intervention). In another example, one or more operations of the AUFO workflow is performed without manual intervention (e.g., no user intervention).

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 7 is a high-level flow diagram illustrating a set of operations for performing a storage expansion process in accordance with an embodiment of the present disclosure.

FIGS. 11A and 11B provide a flow diagram illustrating a computer-implemented method 1100 of operations to provide support for an automatic unplanned failover (AUFO) feature while a data replication relationship for a local CG1 and a remote CG2 is being expanded.

DETAILED DESCRIPTION

Figure 1:
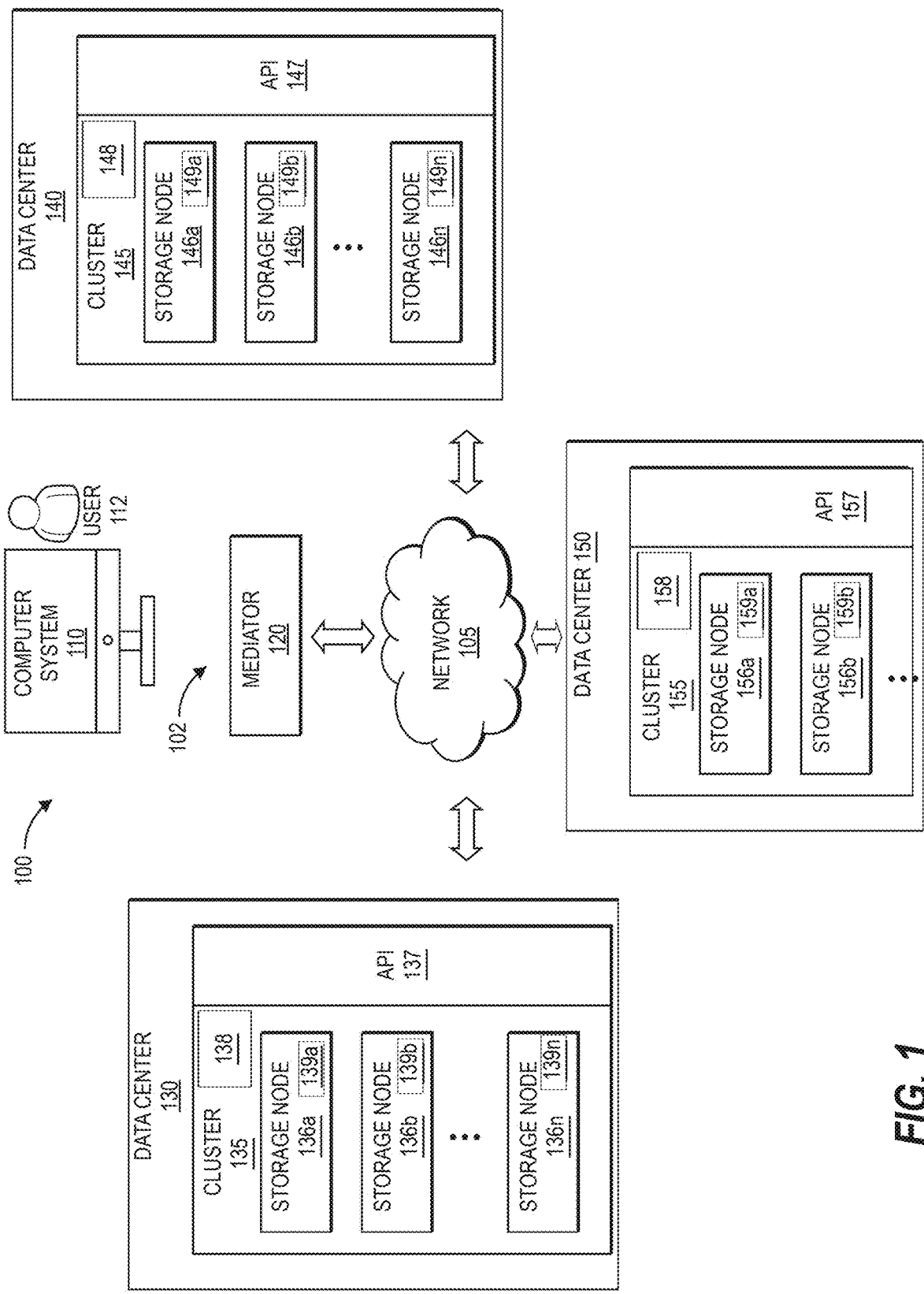
FIG. 1 is a block diagram illustrating an environment in which various embodiments may be implemented.

Systems and methods are described for adding a new member (e.g., storage volume), adding an existing empty member, or adding an existing non-empty member to an existing synchronous data replication relationship between a CG of a primary storage site and a paired CG of a secondary storage site (e.g., peered CG of the secondary storage site) while maintaining zero RPO and zero RTO for the peered CGs of a distributed storage system. User I/O or logical unit number (LUN) ops on the existing members (e.g., storage volumes) of the synchronous data replication relationship are not impacted while the relationship is going through an expansion. Existing volumes of the paired CGs can also participate in nondisruptive operations and the ongoing expansion has no impact on nondisruptive operations. This solution for expansion is highly resilient and restarts automatically in case of transient failure. In one example, if the expand has failed or if there is a non-disruptive operation (NDO) during expand, then the expand will restart automatically without manual intervention and will be completed. Further, the solution is generalized, simplified, and adds value in terms of flexibility and convenience for a user that is expanding the storage.

Prior approaches are not able to add volumes to a grouping of storage volumes that is protected by a synchronous data replication relationship without impacting the zero RPO and zero RTO state of the synchronous data replication relationship. A user has to delete the existing synchronous data replication relationship, add the new volumes to a grouping of volumes on a primary storage site and then recreate the synchronous data replication relationship. This process is disruptive as it removes the RPO protection.

In one example, the primary storage site and secondary storage site are located in relatively close proximity (e.g., less than 100 km, proximity based on round trip time guarantees for synchronous replication datasets) and a tertiary storage site is located at a greater distance. In another example, one or more of the storage sites (e.g., one storage site, two storage sites, three storage sites) can be located in a private or public cloud, accessible (e.g., via a web portal) to an administrator associated with a managed service provider and/or administrators of one or more customers of the managed service provider, includes a cloud-based, monitoring system provided that network connectivity is suitable for synchronous replication between the two synchronous replicated copies. Furthermore, other combinations for the storage sites are possible, for example, one storage site on premise and two storage sites in the cloud and other such variants. The three site topology is applicable to cloud-resident workloads and datasets as well. For a fully cloud resident dataset, two sites can be in the same region (e.g., same availability zone (AZ) or different AZs with sync replication being a limit to a distance between the two sites) and the third site can be in a different region (e.g., a long distance dataset copy) or even an on premise data center. Availability zones (AZs) are isolated data centers located within specific regions in which public cloud services originate and operate. Cloud computing businesses typically have multiple worldwide availability zones. A cloud-resident workload is an application, service, capability, or a specified amount of work that consumes cloud-based resources (e.g., computing or memory power). Databases, containers, microservices, VMs, and Hadoop nodes are examples of cloud workloads.

In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. The present storage solution provides nondisruptive storage expansion for expanding members of existing synchronous data replication relationships. This storage solution allows adding a new volume, adding an empty volume, or adding a non-empty volume to an existing synchronous data replication relationship without impacting the zero RPO and zero RTO of the synchronous data replication relationship. This storage solution defines transactional semantics to establish a zero RTO behavior for before, during, and after the expansion with sufficient persistent state in the design to handle failures and recovery. Embodiments of a failover storage solution provide support for an automatic unplanned failover (AUFO) feature while a data replication relationship for a local CG1 and a remote CG2 is being expanded within a cross-site storage system (e.g., cross-site high-availability (HA) storage solutions). The AUFO feature provides non-disruptiveness in presence of failures in accordance with embodiments of the present disclosure.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135, 145, and optional cluster 155 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, an optional data center 150, and optionally a mediator 120. The data centers 130, 140, 150, the mediator 120, and the computer system 110 are coupled in communication via a network 105, which, depending upon the particular implementation, may be a Local Area Network (LAN), a Wide Area Network (WAN), or the Internet.

The data centers 130, 140, and 150 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130, 140, and 150 may represent a colocation data center in which a company rents space of a facility owned by others and located off the company premises. The data centers are shown with a cluster (e.g., cluster 135, cluster 145, cluster 155). Those of ordinary skill in the art will appreciate additional IT infrastructure may be included within the data centers 130, 140, and 150. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center. The cluster 155 of optional data center 150 can have an asynchronous relationship, synchronous relationship, or be a vault retention of the cluster 135 of the data center 130.

Turning now to the cluster 135, it includes a configuration database 138, multiple storage nodes 136a-n each having a respective mediator agent 139a-n, and an Application Programming Interface (API) 137. In the context of the present example, the multiple storage nodes 136a-n are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n each having a respective mediator agent 149a-n, and an Application Programming Interface (API) 147. In the context of the present example, the multiple storage nodes 146a-n are organized as a cluster and provide a distributed storage architecture to service storage requests issued by one or more clients of the cluster. Turning now to the optional cluster 155, it includes a configuration database 158, multiple storage nodes 156a-b each having a respective mediator agent 159a-b, and an Application Programming Interface (API) 157.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only three data centers are shown in the context of the present example, it is to be appreciated that additional clusters owned by or leased by the same or different companies (data storage subscribers/ customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
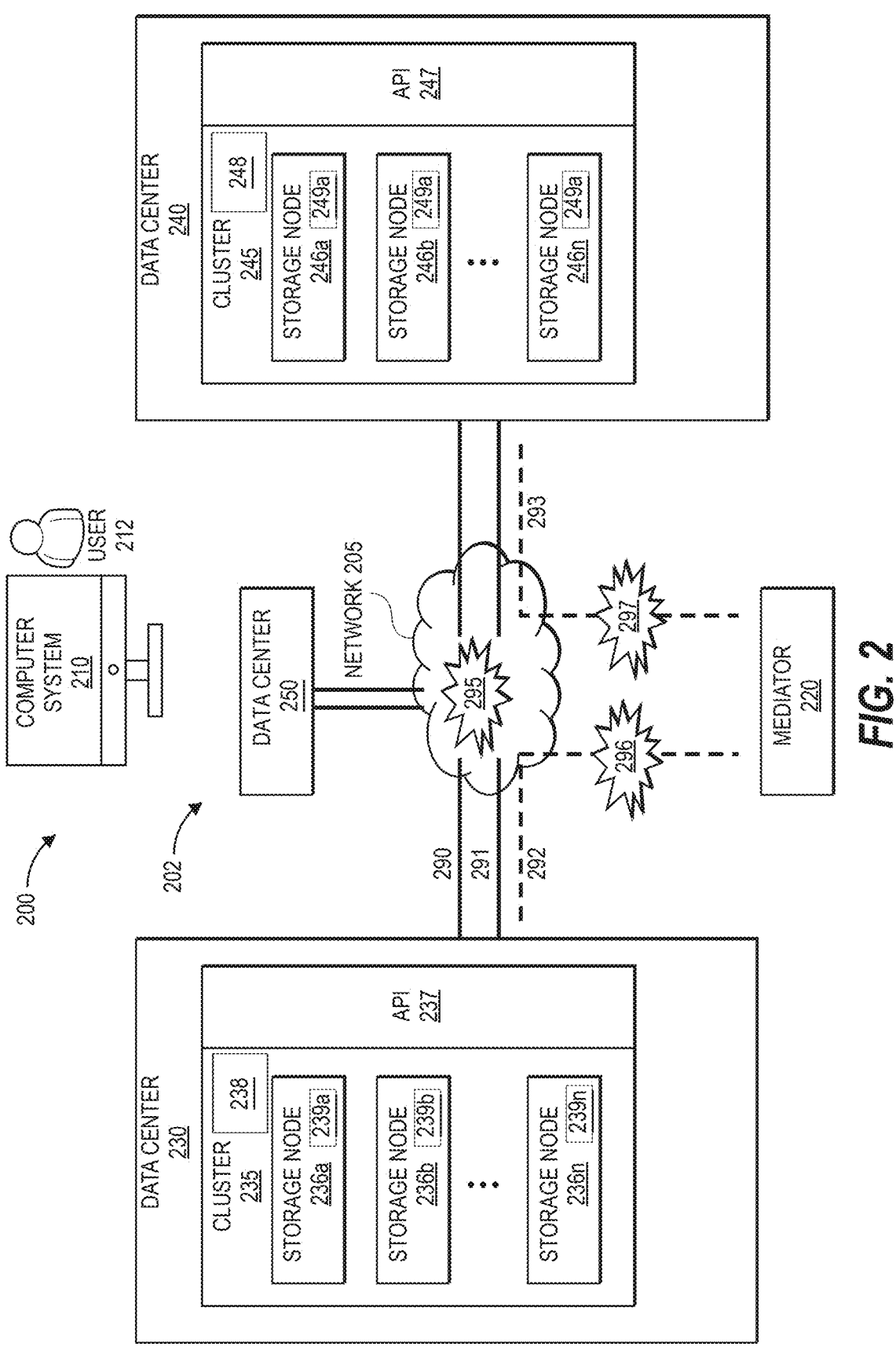
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, an optional data center 250, and optionally a mediator 220. The data centers 230, 240, and 250, the mediator 220, and the computer system 210 are coupled in communication via a network 205, which, depending upon the particular implementation, may be a Local Area Network (LAN), a Wide Area Network (WAN), or the Internet.

The data centers 230, 240, and 250 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230, 240 and 250 may represent a colocation data center in which a company rents space of a facility owned by others and located off the company premises. The data centers 230 and 240 are shown with a cluster (e.g., cluster 235, cluster 245). The data center 250 includes similar components as data centers 230 and 240. Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236a-b, optionally includes additional storage nodes (e.g., 236n) and an Application Programming Interface (API) 237. The storage nodes 236a-n each include a respective mediator agent 239a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246a-b, optionally includes additional storage nodes (e.g., 246n) and includes an Application Programming Interface (API) 247. The storage nodes 246a-n each include a respective mediator agent 249a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure can occur in a cluster hosting the secondary mirror copy of the data. The failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The failover feature allows switching storage access from a primary copy of the data center 230 to a mirror copy of the data center 240 or vice versa.

Figure 3:
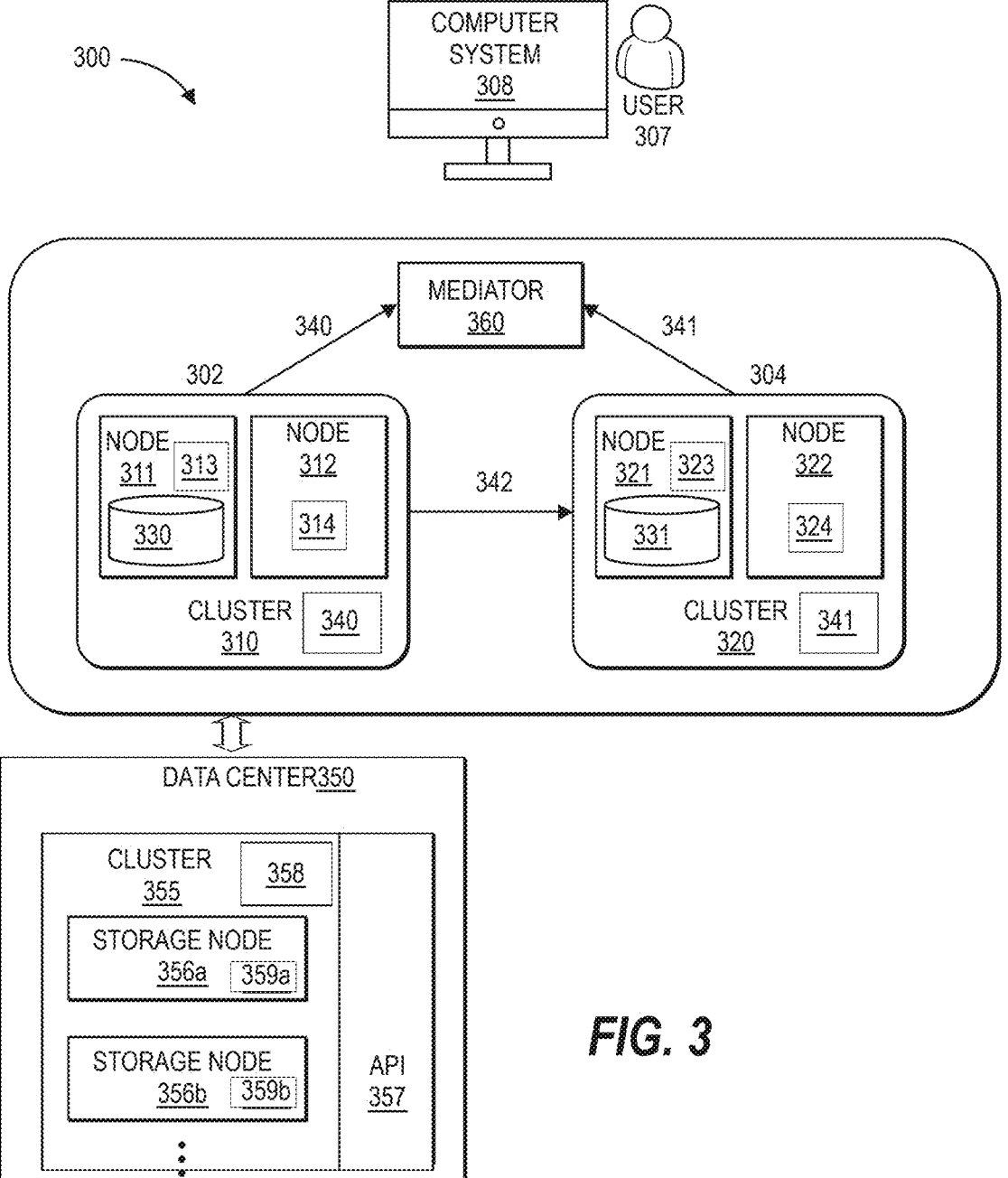
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, an optional data center 350 having a cluster 355, and a mediator 360. The clusters 310, 320, 355, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312, the cluster 320 includes nodes 321 and 322, and the optional cluster 355 includes nodes 356*a* and 356*b*. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360. The cluster 355 may have an asynchronous replication relationship with cluster 310 or a mirror vault policy. The cluster 355 includes a configuration database 358, multiple storage nodes 356*a-b* each having a respective mediator agent 359*a-b*, and an Application Programming Interface (API) 357.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324, 359*a*, 359*b*) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 form a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
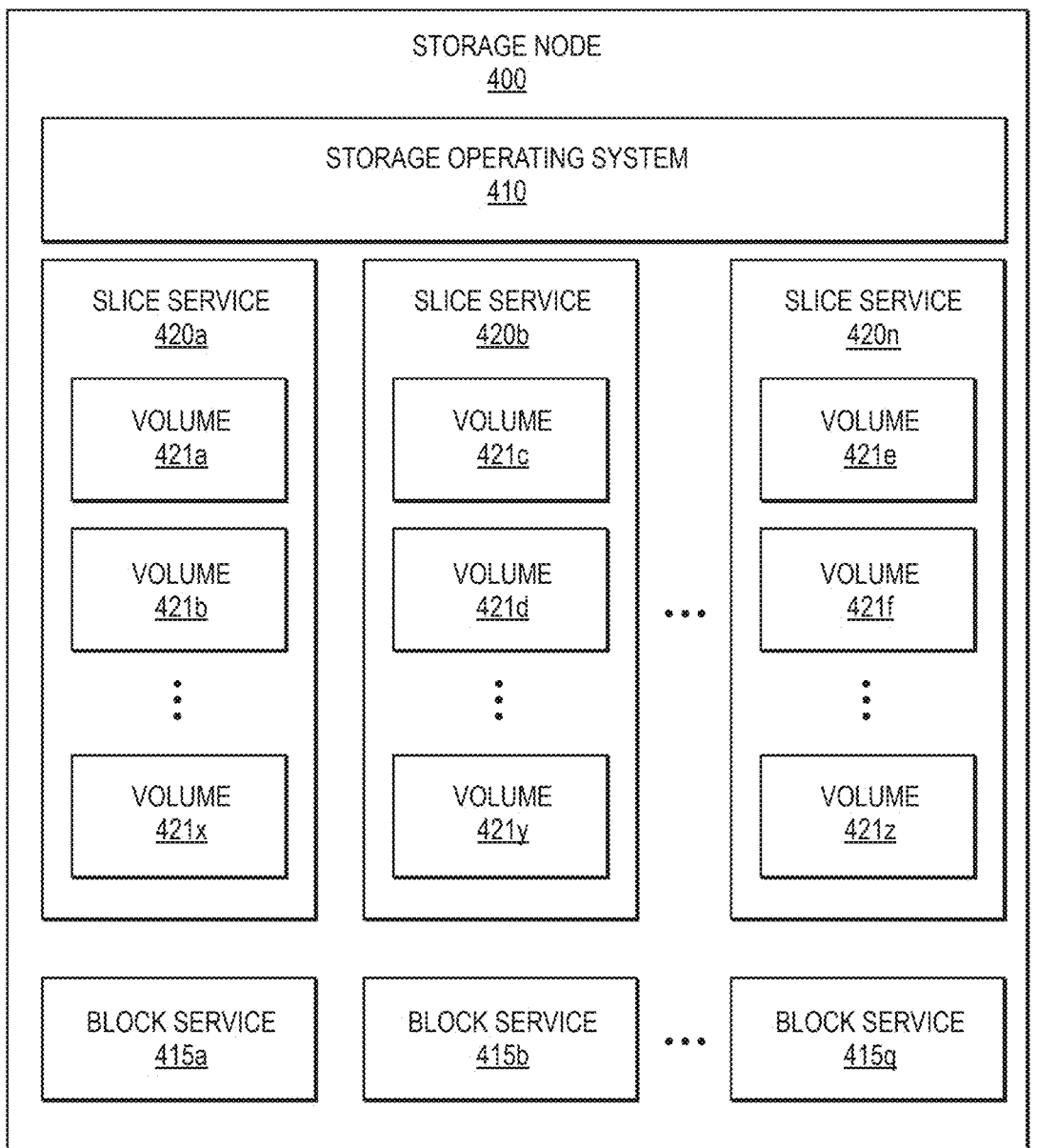
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, 322, 712, 714, 752, 754) described herein. In the context of the present example, a storage node 400 may be a network storage controller or controller that provides access to data stored on one or more volumes. The storage node 400 includes a storage operating system 410, one or more slice services 420*a-n*, and one or more block services 415*a-q*. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
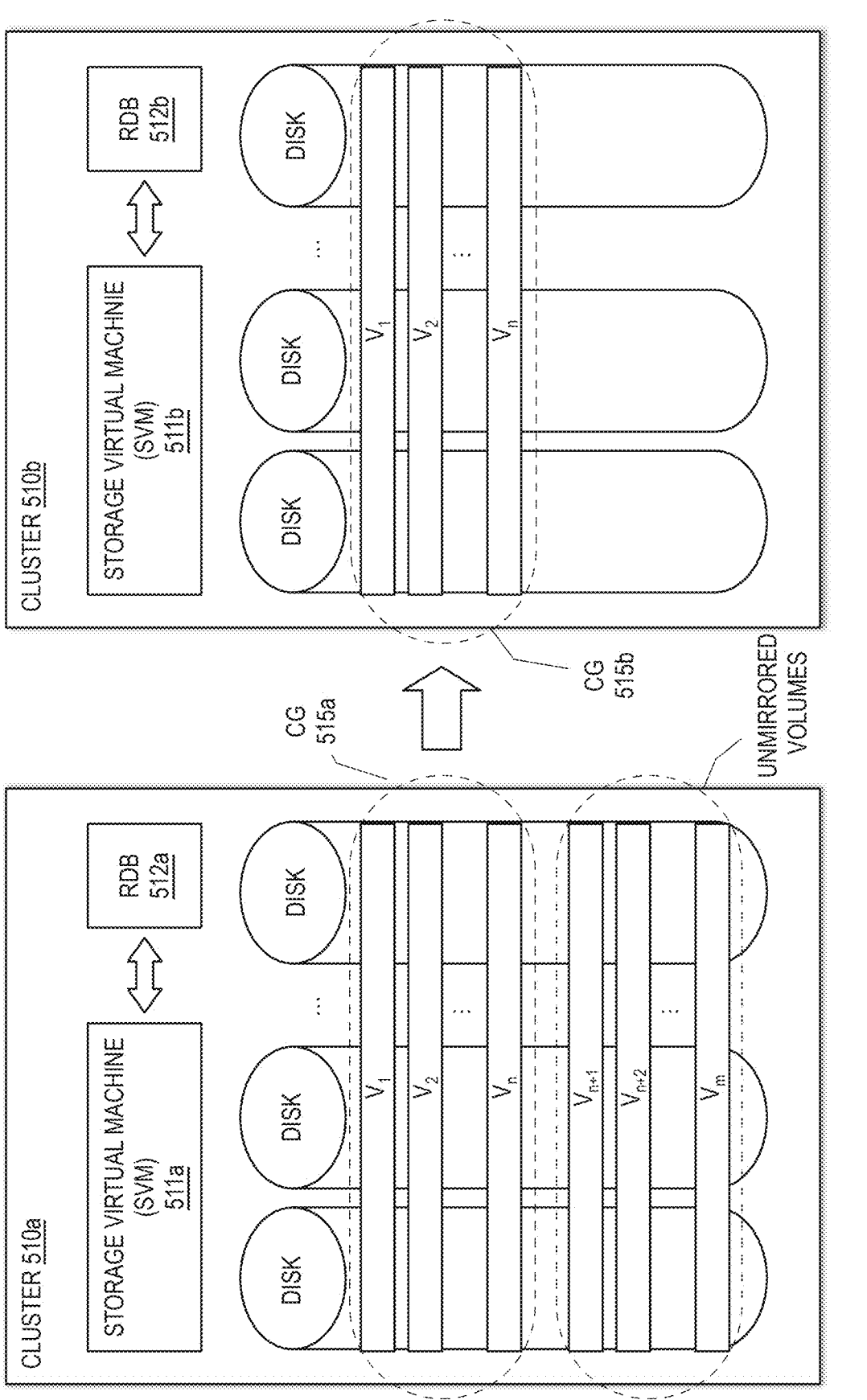
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, storage expansion, container expansion, conversion process, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time.

The volumes of a CG may span multiple disks (e.g., electromechanical disks and/or SSDs, redundant array of independent (RAID) disks) of one or more storage nodes of the cluster. RAID disks store the same data in different place on multiple hard disks or SSDs to protect data in case of a drive failure. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b.

Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

The level of granularity of operations supported by a CG is useful for various types of applications. As a non-limiting example, consider an application, such as a database application, that makes use of multiple volumes, including maintaining logs on one volume and the database on another volume. In such a case, the application may be assigned to a local CG of a first cluster that maintains the primary dataset, including an appropriate number of member volumes to meet the needs of the application, and a remote CG, for maintaining a mirror copy of the primary dataset, may be established on a second cluster to protect the local CG.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of (or "peered") CGs associated with different clusters (e.g., from a primary cluster to a secondary cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary cluster is stored on more than one secondary cluster.

The various nodes (e.g., storage nodes) of the distributed storage systems described herein, and the processing described below with reference to the flow diagrams of FIGS. 7-12 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 13 below.

Figures 6A, 6B:
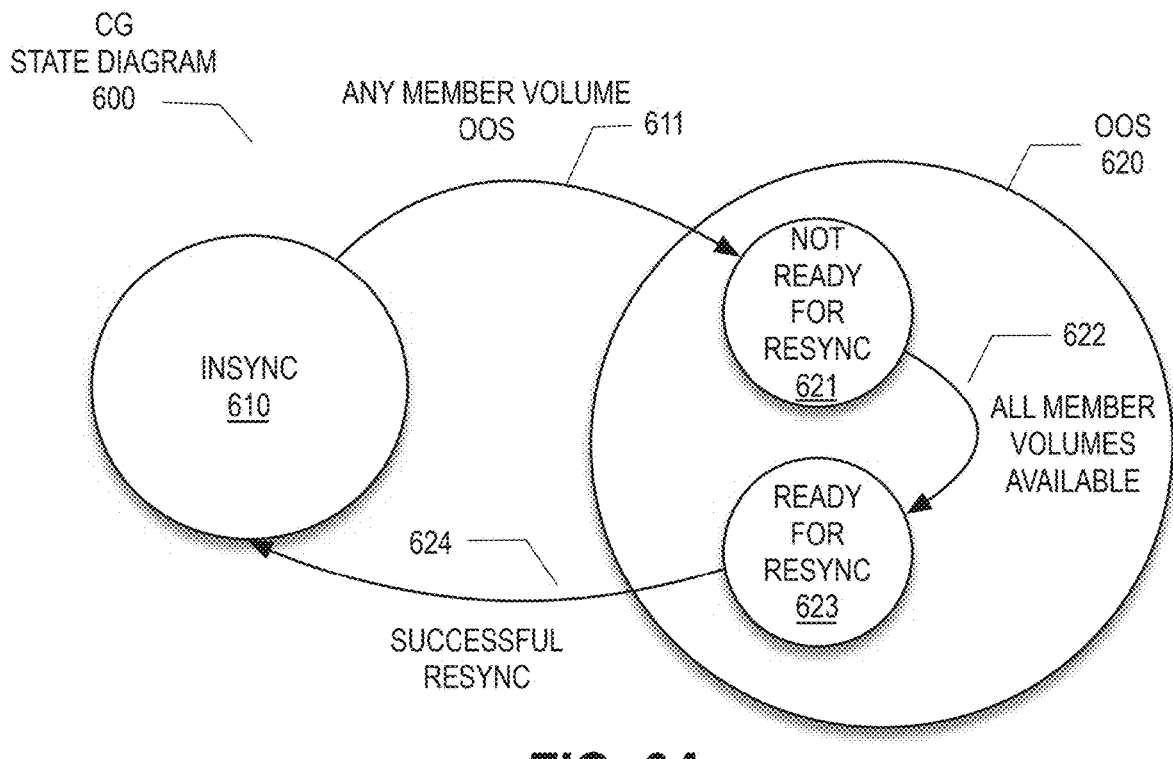
FIG. 6A is a CG state diagram in accordance with an embodiment of the present disclosure.
FIG. 6B is a volume state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG may be managed as a single unit for various situations. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to bring the CG back into the InSync state from the OOS state. Responsive to a successful CG resync, a given CG may transition 624 from the ready for resync state 623 to the InSync state.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 631 from the InSync state to the OOS state responsive to a peer volume being unavailable. A given volume may transition 632 from the OOS state to the InSync state responsive to a successful resynchronization with the peer volume. As described below in further detail, in one embodiment, two different types of resynchronization approaches may be implemented, including a Fast Resync process and a CG-level resync process, and selected for use individually or in sequence as appropriate for the circumstances.

Storage Expansion Processing

FIG. 7 is a high-level flow diagram illustrating a set of operations for performing a storage expansion process in accordance with an embodiment of the present disclosure. At block 710, state information regarding members (e.g., storage volumes) of a local CG is maintained. The state information may include a data replication status of a mirror copy of a dataset associated with a local CG (e.g., CG 515a) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

A storage expansion operation is considered to be a coordinated operation among any new volumes being added to a CG and so until all the new volumes that are being added into an existing consistency group (CG) complete the expand process, the new volumes cannot participate in internal operations for the consistency group relationship. The Zero RPO and Zero RTO on the volumes being added to a CG is guaranteed only after the expand is successfully completed for all the specified new volumes. The replication failures, if any, on the new volumes to be added to the CG, during expand, does not cause OOS state on existing volumes of the CG. The original volumes of the CG can still go through coordinated OOS (e.g., if there is a replication failure or nondisruptive operation on the existing volumes) and in such case the expanding volumes do not participate in the coordinated OOS (C-OOS). After the transfer is completed and all the new volume relationships reach in-sync, then these volumes can participate in the C-OOS operation.

At decision block 720, it is determined whether a storage expansion process has been initiated. If so, then processing continues with block 730; otherwise, processing loops back to decision block 720. According to one embodiment, at block 730 a persistent replicated database (RDB) table will be created to store details about one or more members (e.g., storage volumes) that are being added to a pair of CGs including a local CG and a remote CG on which expand is ongoing. When the storage expansion process is triggered, an entry will be added to this RDB table for every new member (e.g., storage volume) specified by the user. The entries in this table for the CG will get deleted only after successful completion of CG expand operation for all the new volumes specified by the user for that particular CG.

At block 740, the storage expansion process will utilize an existing resync workflow to complete an asynchronous transfer between a new source member of the local CG and a peered new destination member of the remote CG, establish a sync engine and reach in-sync state for the new source member and the peered new destination member.

At block 750, a new indicator (e.g., internal flag) is set to denote that this is a special resync operation in which existing members (e.g., storage volumes) of the local and remote CGs do not participate in the re-sync operation and only the new volumes being added proceed through the special resync operation. At block 760, an indicator (e.g., persistent bit) will be set on the new volumes which will be used to skip an OOS procedure on these volumes if there is any replication failure on these volumes during the storage expansion process.

At block 770, this persistent bit will get cleared, in coordinated fashion, after all the new volumes participating in expand reach the in-sync state. At block 780, an indicator (e.g., internal non-persistent mechanism, persistent mechanism) will be used to check if the storage expansion process has to be restarted for a CG relationship due to a failure. In one example, internal cache for a storage node will store non-persistent expand-in-progress information which will be used to restart expand in case of failures. An existing job based monitoring of the health/status of the CG relationship will be improved to also check if any relationship is in pending/failed expand state and so to restart the storage expansion process if so. If the destination cluster goes down/reboot during the storage expansion process, then the expand-in-progress information stored in persistent RDB tables will help in identifying that expand must be restarted after the destination cluster is up. This makes the storage expansion process resilient from NDOs or transient failures. Support for non-disruptive operations enables performing of many common maintenance tasks without scheduling down time. Operations supported include takeover and giveback, provided that a single node is surviving among each of the two clusters.

The sequence of steps followed in application storage expansion (e.g., a new source and a new destination volume) will also be followed in a container expansion (e.g., an existing source volume and a new destination volume are being added to paired CGs):

i) Source CG expand—Adding the specified volume(s) to the source consistency group, ii) Destination CG expand-Adding the specified volume (s) to the destination consistency group.

iii) Data replication relationship (e.g. a synchronous data replication relationship) expand—Establishing a data replication relationship and bringing to in-sync state for the new volumes.

A storage expansion process is completely opaque to the existing volumes of the paired CGs and so the existing volumes can participate in both planned and unplanned NDO operations during the storage expansion process. This can cause the ongoing expand to fail and in such cases the expand automatically restarts on its own. There can be unplanned NDO on the new volumes of the data replication relationship as well and in such cases the expand automatically restarts after completing the NDO.

Figure 8:
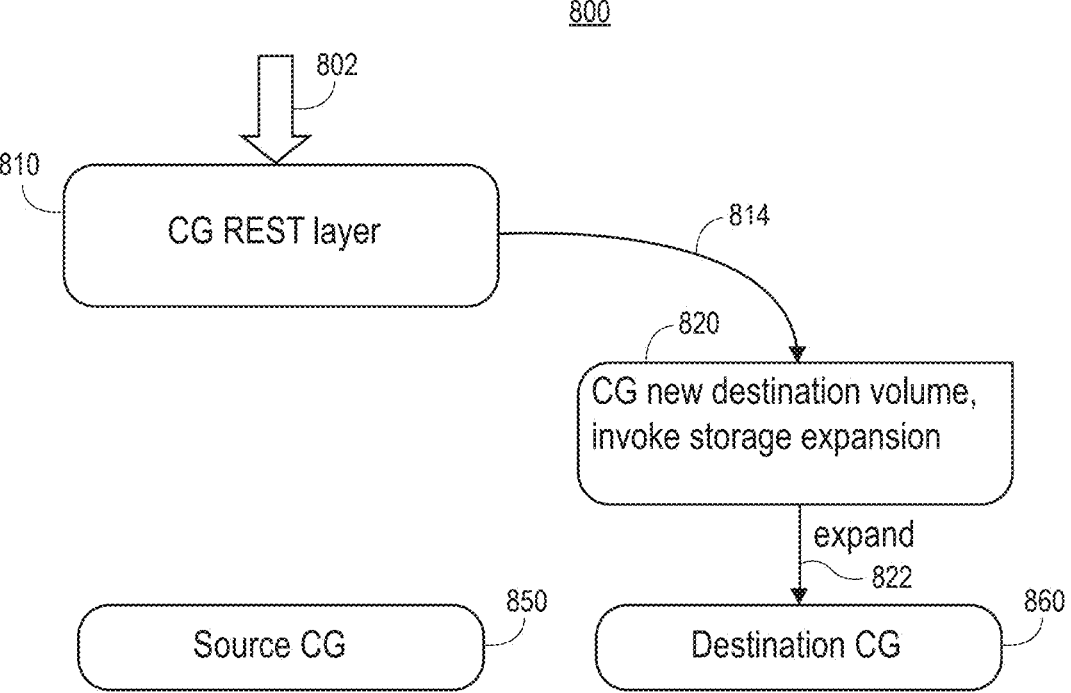
FIG. 8 is a flow diagram illustrating a set of operations for performing an application storage expansion process in accordance with an embodiment of the present disclosure.

FIG. 8 is a flow diagram illustrating a set of operations for performing an application storage expansion process in accordance with an embodiment of the present disclosure. State information regarding members (e.g., storage volumes) of a local CG is maintained. The state information may include a data replication status of a mirror copy of a dataset associated with a local CG (e.g., CG 515a) that may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

At block 810, a CG Representational State Transfer (REST) ful API layer receives a CG expansion process 802 from a system manager of a distributed storage system. The CG REST API layer adds a new source volume to a source CG 850 of a source cluster of the distributed storage system and then sends a protect request 814 to block 820 for a destination cluster. The block 820 creates a new destination volume(s), adds a new destination volume to a destination CG of the destination cluster of the distributed storage system, and invokes a storage expansion with a new source volume being added to the source CG and a new destination volume being added to the destination CG. Block 820 sends the storage expansion 822 to the destination CG 860 to add the new destination volume to the destination CG.

Expanding CG with 'new volume, new LUN' is considered as a storage expansion use case. A one click workflow 800 for a user is illustrated in FIG. 8 that creates new source volume, new LUNs on new source volume, a new destination volume, and then adds these volumes to the existing data replication relationship between the source CG 850 and the destination CG 860.

Initiator groups (Igroup) arc tables of a FC protocol host world wide port name (WWPNs) or iSCSI host node names. Igroups can be defined and mapped to LUNs to control which initiators have access to LUNs. Igroup information cannot be specified in the expand request. After expansion is completed, a user will manually map the LUNs on the new source volume in the source cluster and the new destination volume in the destination cluster. There are no restrictions on LUN operations on existing volumes of the source and destination CGs. The new volumes cannot have I/O operations till expand is successfully completed as the LUN mappings are prevented. Thus, the write order consistency in the destination cluster on existing volumes of CG is not impacted due to ongoing expand operation.

Figure 9:
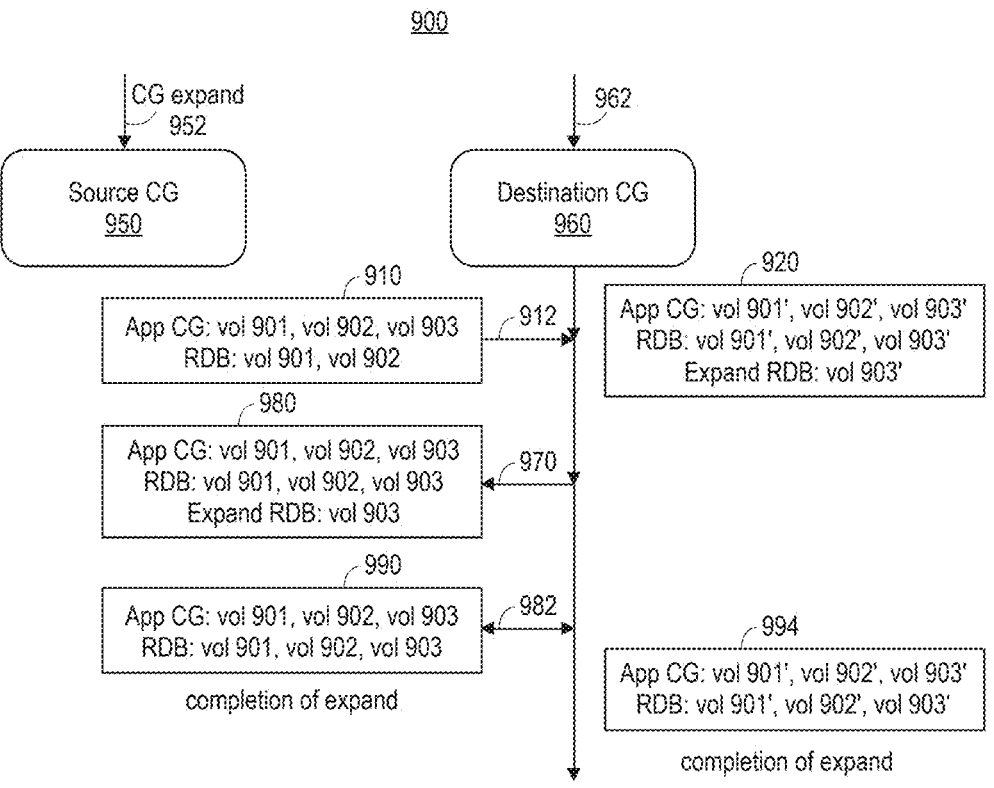
FIG. 9 is a flow diagram illustrating a set of operations for performing a container expansion process in accordance with an embodiment of the present disclosure.

FIG. 9 is a flow diagram illustrating a set of operations for performing a container expansion process in accordance with an embodiment of the present disclosure. State information regarding members (e.g., storage volumes) of a local CG is maintained. The state information may include a data replication status of a mirror copy of a dataset associated with a local CG (e.g., CG 515*a*, source CG 950) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

A source CG cluster 950 receives a CG expansion input 952 from a system manager of a distributed storage system. A destination CG cluster 960 receives a CG expansion input 962. At block 910 for the source CG, the application CG includes volume 901, volume 902, and a selected existing source volume 903 being added by the application to the source CG cluster 950. A replicated database (RDB) has entries for volume 901 and volume 902 of the source CG cluster 950.

A cross cluster call 912 is sent from the source CG to the destination CG to add a new destination volume 903' to the destination cluster 960. In response to the call 912, at block 920, the application CG and replication database both include destination volumes 901'-903' due to expand CG adding a new destination volume 903'. A remote call 970 from destination CG 960 to source CG 950 is sent to update CG configuration on the source CG 950. In response to the call 970, at block 980, the application CG and replication database both include source volumes 901-903 due to expand CG adding the selected existing source volume 903.

A transfer workflow 982 starts a workflow for the new destination volume 903'. At block 990, the application CG and replication database both include source volumes 901-903 and expansion completes on the source CG 950. At block 994, the application CG and replication database both include destination volumes 901'-903' and expansion completes on the destination CG 960.

Expanding CG with 'existing volume' is considered as a container use case. A one click workflow 900 as illustrated in FIG. 9 creates a new destination volume and then adds a selected pre-existing source volume and the newly created destination volume to the existing data replication relationship between the source CG and the destination CG. Specifying igroup information as part of expand is not allowed in this scenario as well. After expand is completed, a user will have to manually apply the LUN mapping for new volumes in the source and destination CGs. The selected preexisting source volume may have LUNs with mappings already and this source volume will continue to work and in such case the I/O operations will continue to happen on this volume while expand is in progress. As the individual volumes are expected to have separate data sets in a container use case, the write order consistency on the destination cluster on existing volumes is not a requirement. There are no restrictions on LUN operations on existing volumes of the CG.

A sequence of steps followed in a conversion use case (e.g., an existing source volume and an existing destination volume are being added to paired CGs) are:

i) Delete existing specified volume relationships for the existing source volume(s) and the existing destination volume(s) to be added to paired CGs, ii) Release the specified volume relationships for the existing source volume(s) and the existing destination volume(s) to be added to paired CGs, and iii) Expand an existing data replication relationship for the members of the paired CGs with the volumes from (i) and (ii).

If given volume(s) have large data churn then the expand operation is expected to run for a longer duration. In order to minimize a time delay for the CG expansion process, it is advised to have a base line transfer of data done on these volumes separately by having an async/sync relationship and then go through conversion use case as described for FIG. 10 to convert/add these volumes to the existing data replication relationship.

Figure 10:
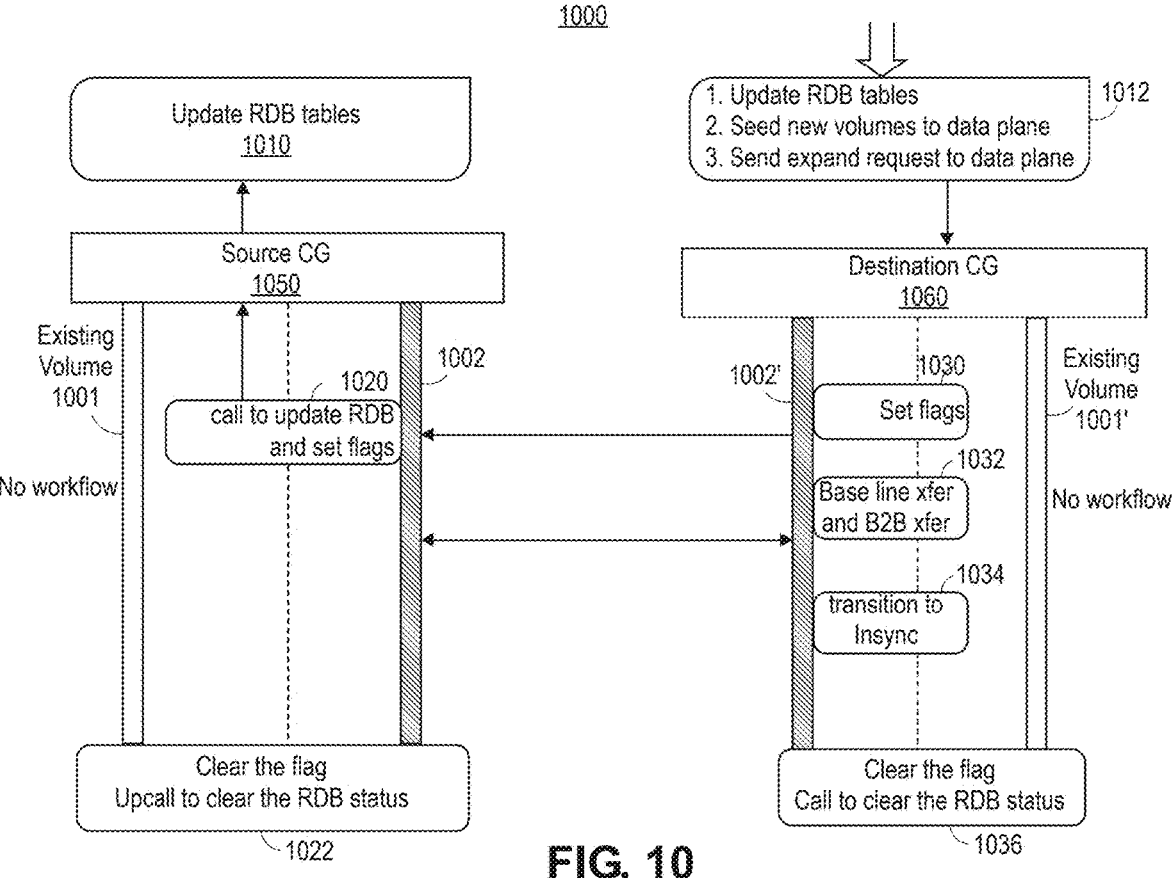
FIG. 10 is a flow diagram illustrating a set of operations for performing an expansion process with an existing destination volume in accordance with an embodiment of the present disclosure.

FIG. 10 is a flow diagram illustrating a set of operations for performing an expansion process with an existing destination volume in accordance with an embodiment of the present disclosure. State information regarding members (e.g., storage volumes) of a local CG is maintained. The state information may include a data replication status of a mirror copy of a dataset associated with a local CG (e.g., CG 515*a*, source CG 1050) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

A source CG cluster 1050 has an existing volume 1001 and receives a CG expansion input from a system manager of a distributed storage system to add an existing volume 1002 to the source CG. A call 1020 to source CG 1050 causes an update of RDB tables 1010 to include the existing volume 1002 as a member of the source CG. The call 1020 also sets flags (e.g., RAID flags) on the volume 1002 and a volume 1002' of the destination cluster 1060. A baseline data copy transfer and baseline to baseline data copy transfer of data between the volume 1002 and the volume 1002' occurs at operation 1032. The volume 1002 and the volume 1002' then transition to in sync state at 1034.

At block 1012, RDB tables of the destination CG 1060 are updated, new volumes are seeded to a data plane, and an expand request is sent to the data plane. At block 1022, the flag is cleared from the volume 1002 and an upcall clears the RDB status for the source CG 1050. At block 1036, the flag is cleared from the volume 1002' and a call clears the RDB status for the destination CG 1060.

Expanding CG with preexisting source volume and preexisting destination volume as illustrated in workflow 1000 is the conversion use case. This is a variant of container expansion except that it will not create a new destination volume and instead use the given preexisting destination volumes. All the behavior described above for Container Expansion is applicable here as well. This use case allows converting existing asynchronous or synchronous relationships to an existing data replication relationship. A one-click workflow 1000 deletes the given relationships (if any exist) and then expands the existing data replication relationship with these existing volumes 1002 and 1002'. If the given destination volumes have LUN mappings already, then this conversion/expand request will fail. A user will have to unmap the LUNs on these volumes and trigger expand again. There are no restrictions on LUN operations on existing volumes 1001, 1001' of CG, similar to above two use cases.

A data replication relationship that provides a business continuity solution for a software application typically has a collection of storage volumes. A common requirement for expanding this collection includes providing non-disruptive operations to business continuity protection. This business continuity solution has a mechanism that allows the data replication relationship to be capable of failover from a local storage cluster initially having a primary role for serving I/O operations to a remote storage cluster subsequently having a primary role for serving I/O operations while the data replication relationship is going through expand so that the software application doesn't experience any disruption in case of disaster at the primary storage cluster. Any collection or data set that is maintaining multiple copies of data for redundancy and high-availability would want to allow expand and also maintain transactional semantics during expand. Before expand and during expand, the CG should be considered as the collection of original volumes and after expand completion the CG configuration must include all the volumes including the original volume and any new volumes added during the expand. The failover solution during the expand of the CG must follow these semantics. Along with this, in case of application storage expansion, the dependent write order consistency should be guaranteed among the volumes of the CG.

FIGS. 11A and 11B provide a flow diagram illustrating a computer-implemented method 1100 of operations to provide support for an automatic unplanned failover (AUFO) feature while a data replication relationship for a local CG1 and a remote CG2 is being expanded. The AUFO feature provides non-disruptiveness in presence of failures in accordance with an embodiment of the present disclosure. This AUFO feature of the present design provides an order of operations such that a primary copy of data at a primary storage site continues to serve I/O operations until a mirror copy of the data at secondary storage site is ready. This AUFO feature provides non-disruptiveness for I/O operations in case of disaster at the primary storage site. The AUFO feature also avoids a split-brain situation by the way of a strong consensus (e.g., strong consensus in a PAXOS instance) based on having the primary copy of the data at the primary storage site, a mirror copy of the data at the secondary storage site, and an external mediator at a third site.

Although the operations in the computer-implemented method 1100 are shown in a particular order, the order of the actions can be modified. Thus, the illustrated embodiments can be performed in a different order, and some operations may be performed in parallel. Some of the operations listed in FIGS. 11A and 11B are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 1100 may be executed by a storage controller, a storage virtual machine (e.g., SVM 511*a*, SVM 511*b*), a mediator (e.g., mediator 120, mediator 220, mediator 360), a mediator agent (e.g., mediator agent 139*a*-139*n*, mediator agent 149*a*-149*n*, mediator agent 239*a*-239*n*, mediator agent 249*a*-249*n*, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes the primary storage site having a first cluster with a primary copy of data in a consistency group (CG1). The consistency group of the first cluster is assigned a master role. A second cluster of the secondary storage site has a secondary mirror copy of the data in a consistency group. The consistency group of the second cluster (CG2) is assigned a slave role.

At operation 1110, the computer-implemented method includes replicating, with a communication channel, the primary copy of the data of the members (e.g., original source volumes) of the first cluster of the primary storage site to the secondary copy of the data in the members (e.g., original destination volumes) of the second cluster of the secondary storage site for a data replication relationship (or relationship) between the first and second clusters.

At operation 1115, the method includes initiating a storage expansion process including a source expansion to create a new source volume as a member of the CG1 and a destination expansion of the storage expansion process to create a new destination volume as a member of the CG2. The storage expansion process can include setting an indicator (e.g., persistent flag) on any new volumes being added to CG1 or CG2 during the expansion process.

At operation 1120, the computer-implemented method includes determining, with the secondary storage site through intercluster connections or a mediator, whether the primary storage site is reachable during a time period. If the primary storage site is reachable, then the method returns to operation 1120 to continue monitoring for whether the primary storage site is reachable at operation 1120.

If the primary storage site is not reachable, then the first cluster or primary storage site is considered to be non-operational (or potentially non-operational) and the computer-implemented method includes initiating an automatic unplanned failover (AUFO) on the CG2 of second cluster at operation 1130.

If a failover is triggered during a CG expansion process in which members (e.g., new volumes, existing volumes) are being added to the CG1 and CG2 then the failover will consider only the original volumes of CG1 and CG2 and will discard the new volumes going through expand from failover operation. If the failover is triggered after completing the CG expansion process, then the failover will include all the volumes including original volumes and the volumes that were added newly to the CG1 and CG2. The CG expand is considered to be complete only if all the volumes going through expand successfully complete the expand operation. If the expand has been triggered with more than one new volume and the expand workflow has been successful for one of the new volumes while it is in progress for the other new volume, then, in case of failover, both the new volumes will remain read only and will not be failed over. This method 1100 will not end in a state where the failover has considered some of the new volumes going through expand. This method 1100 considers either 'all' or 'none' of the new volumes to be added to the local and remote CGs.

At operation 1135, the method includes determining whether a CG storage expansion process is in progress. In one example, a persistent RDB table is checked to see if a CG expansion process state is in progress. If the CG storage expansion process is in progress, then continue with below procedure at operation 1140. If not (new volumes have been successfully added to CG1 and CG2), fall back to existing mechanism of failover that happens on all the volumes of CG1 and CG2 at operation 1133.

At operation 1140, for in progress CG storage expansion, the computer-implemented method includes checking an indicator (e.g., persistent flag) on any new volumes being added to CG1 or CG2 during the expansion process.

At operation 1142, the computer-implemented method includes initiating the unplanned failover workflow (or automated unplanned failover workflow without manual intervention) only on the original set of volumes in the CG1 of the first storage cluster and the CG2 of the second storage cluster. The new volumes having the indicator set will not be part of the failover workflow. In one example, initiating the AUFO workflow is performed without manual intervention (e.g., no user intervention). In another example, one or more operations of the AUFO workflow is performed without manual intervention (e.g., no user intervention).

At operation 1144, the computer-implemented method includes modifying (e.g., shrinking) the CG2 of the secondary cluster to remove details of any new volumes being added from the persistent RDB table. This modifies the CG geometry of CG2.

At operation 1146, the computer-implemented method includes removing the expand in progress state from the persistent RDB table.

At operation 1148, after the primary storage site returns to operational state, the computer-implemented method includes modifying (e.g., shrinking) the CG1 of the primary cluster to remove details of any new volumes being added from the persistent RDB table. This modifies the CG geometry of CG1.

At operation 1150, the computer-implemented method includes establishing a data replication relationship in a flip direction (e.g., data replication from CG2 to CG1) with original set of volumes. The flip direction is opposite of the initial direction from CG1 to CG2. At operation 1152, the computer-implemented method includes initiating the CG storage expansion process manually in response to a new input after the data replication relationship is established in flip direction post failover.

The behavior of unplanned failover during expand in two uses cases of expand is described below.

Application Storage Expansion

Expanding the CG with 'new volume, new LUN' is considered as the application storage expansion. The dependent write order consistency is a strong requirement for the application storage use case. Thus, the failover support during expand should guarantee that the dependent write order consistency on the second storage cluster of the secondary storage site is guaranteed after failover. This would mean that the new volumes going through expand on CG1 and CG2 should not have any I/O operations and hence there will not be dependent writes between old volume(s) and the new volume(s). The idea is to disallow LUN maps on the new volumes during expand operation, both in the primary storage site and the secondary storage site. As the new volumes are created by the CG expansion process, the new volumes can not have any pre-existing LUNs. This way, the new volumes cannot have I/O operations during the CG expansion process. As the new volumes are not participating in failover, the application cannot send I/O operations to these new volumes post failover. However, the application would not have been sending I/O operations on the new volumes in the primary storage site as well before failover, and so there is no disruption to the new volumes after failover as well.

The alternative options include setting a storage fence on the new volumes during expand to prevent I/O operations (with downside of I/O disruption) or to complete the CG expansion process first before configuring the application to use the new volume.

Container Expansion

This is the use case where a CG is used as a container and hence the CG is a collection of unrelated data sets. Each volume in the CG has its own data set that is unrelated to the other volumes in the CG. Hence the dependent write order consistency is not a strong requirement. Performing expand with existing volumes is considered as a container expansion and so the volumes going through expand might have pre-existing LUNs with maps. Thus, the volumes going through expand might have ongoing I/( ) operations during the container expansion in this use case. As the expanding volumes are not participating in the failover, the application cannot send I/O operations to these new volumes post failover. Due to the CG being a container, the expectation would be a stand alone application that is sending I/O operations to these newly added volumes of the CG and this would not impact the other applications that are sending I/O operations to existing volumes of the CG. There is no need to prevent the ongoing I/O operations on newly added volumes to the CG during the container expansion because dependent write order consistency is not a strict requirement for a collection of unrelated data sets. To maintain similarity. LUN mapping on newly added volumes is disallowed in this use case as well until expand is completed.

In one example, an alternative option is to prevent new LUN creations on new volumes and allow I/O operations on pre-existing LUNs on the new volumes.

Method 1100 provides a zero RTO guarantee during a set (CG) expand process, which can take time. The method 1100 defines semantics specific to target use-cases (e.g., application expansion, container expansion) to deliver a dependent write order consistent automatic-unplanned-failover outcome, delivers a design that defines explicit states (e.g., RDB and data blade volume specific states) and delivers an atomically consistent outcome, error handling, and provides a transactionally consistent state before, during and after expand.

Figure 12:
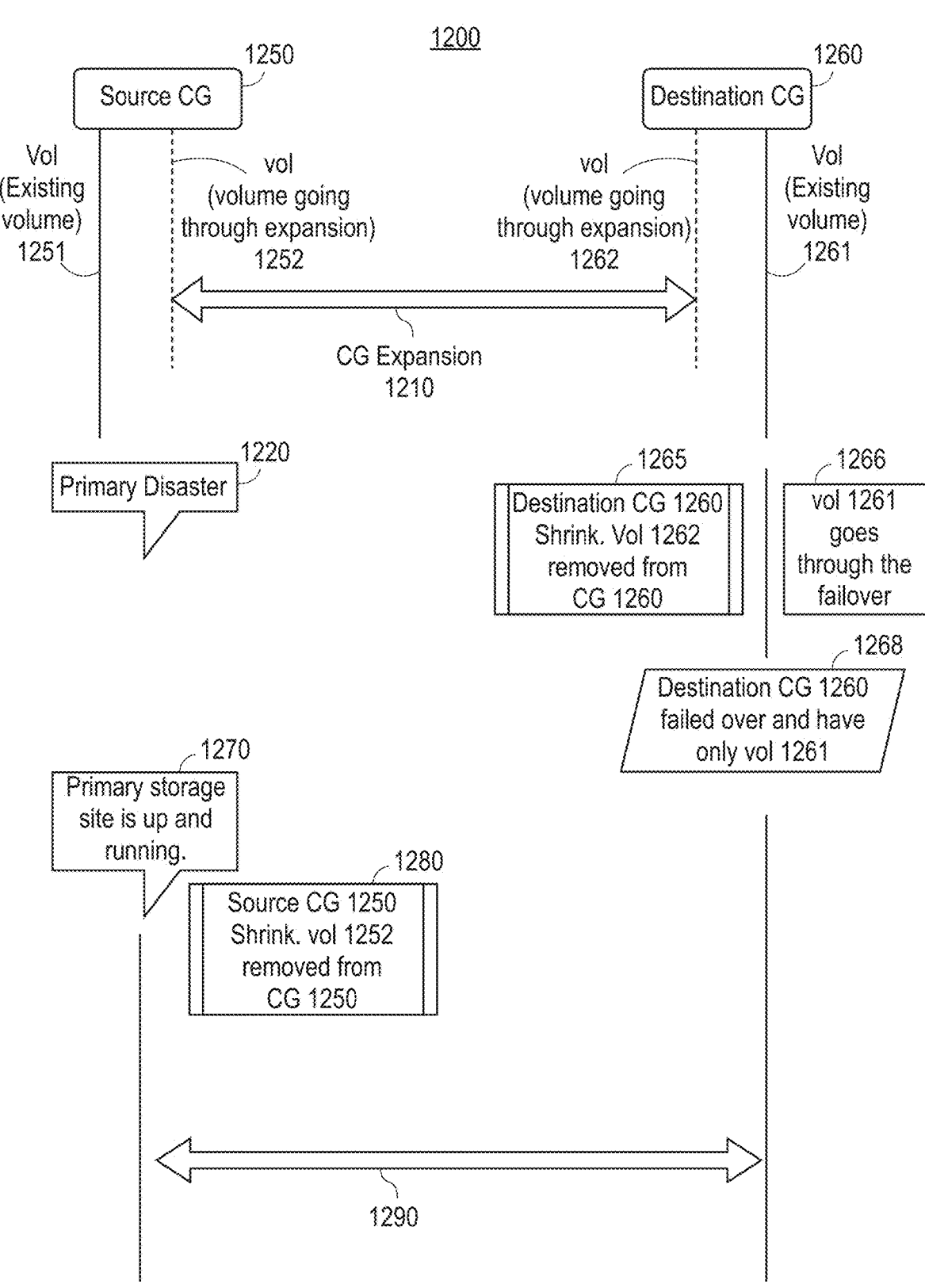
FIG. 12 is a flow diagram illustrating a computer-implemented method 1200 of operations to provide support for an automatic unplanned failover (AUFO) feature while a data replication relationship for a local CG and a remote CG is being expanded.

FIG. 12 is a flow diagram illustrating a computer-implemented method 1200 of operations to provide support for an automatic unplanned failover (AUFO) feature while a data replication relationship for a local CG and a remote CG is being expanded. State information regarding members (e.g., storage volumes) of a local CG is maintained. The state information may include a data replication status of a mirror copy of a dataset associated with a local CG (e.g., CG 1250) may be maintained, for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

A source CG cluster 1250 has an existing volume 1251 and receives a CG expansion input for a CG expansion process 1210 from a system manager of a distributed storage system to add a volume 1252 (e.g., existing volume) to the source CG while also adding a volume 1262 (e.g., existing volume) to the destination CG 1260 that includes an existing volume 1261.

At operation 1220, the computer-implemented method includes determining, with a primary or secondary storage site, that the primary storage site is considered to be non-operational (or potentially non-operational) due to a disaster or failure and the computer-implemented method includes initiating an out of sync (OOS) state for the data replication relationship between the source CG cluster 1250 and the destination CG cluster 1260. The OOS state may be based on OOS events of one or more volumes.

At operation 1265, if a CG expansion process is in progress, then a destination CG cluster 1260 modify (e.g., shrink) will occur with volume 1262 being removed from the destination CG cluster 1260 and details of the volume 1262 being removed from a persistent RDB table.

At operation 1266, the computer-implemented method includes initiating the unplanned failover workflow (or automated unplanned failover workflow) only on the original volume 1251 in the source CG cluster 1250 and the original volume 1261 in the destination CG cluster 1260. Any new volumes being added to the source CG cluster 1250 or destination CG cluster 1260 will not be part of the failover workflow.

At operation 1268, the computer-implemented method includes failing over the destination CG 1260 initially having a primary role for serving I/O operations. The destination CG 1260 will only include volume 1261.

At operation 1270, the primary storage site and the source CG cluster 1250 return to operational state. At operation 1280, the computer-implemented method includes modifying (e.g., shrinking) the source CG cluster 1250 of the primary cluster to remove details of any new volumes (e.g., volume 1252) being added from the persistent RDB table. This modifies the CG geometry of the source CG 1250.

At operation 1290, the computer-implemented method includes resynchronization in a flip direction (e.g., resynchronization with data replication from destination CG 1260 to source CG 1250) with original set of volumes 1261 and 1251. The flip direction is opposite of the initial direction from the source CG cluster 1250 to the destination CG 1260. The computer-implemented method includes initiating the expand operation manually in response to a new input after the data replication relationship is established in flip direction post failover.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 13:
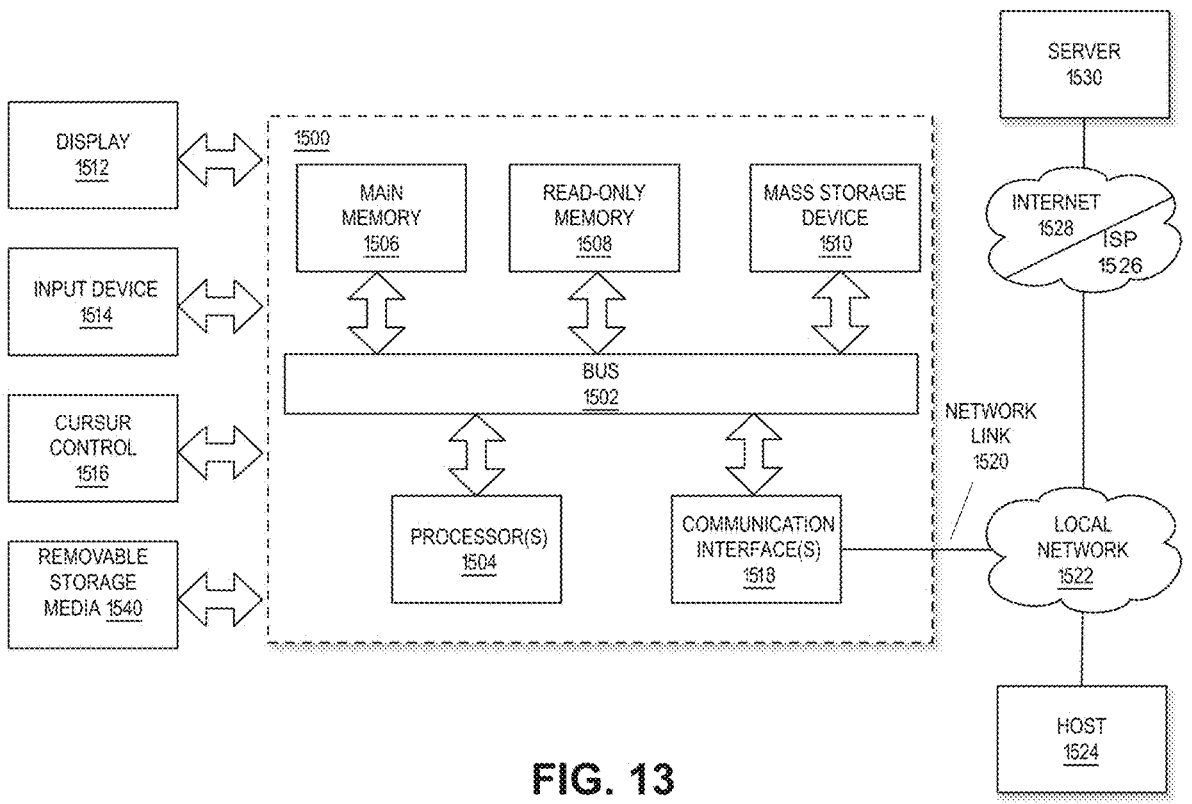
FIG. 13 illustrates an example computer system in which or with which embodiments of the present disclosure may be utilized.

FIG. 13 is a block diagram that illustrates a computer system 1500 in which or with which an embodiment of the present disclosure may be implemented. Computer system 1500 may be representative of all or a portion of the computing resources associated with a storage node (e.g., storage node 136*a-n*, storage node 146*a-n*, storage node 156*a-b*, storage node 236*a-n*, storage node 246*a-n*, nodes 311-312, nodes 321-322, nodes 356*a*-356*b*, storage node 400), a mediator (e.g., mediator 120, mediator 220, mediator 360), or an administrative workstation (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, a non-transitory computer-readable storage medium, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 14:
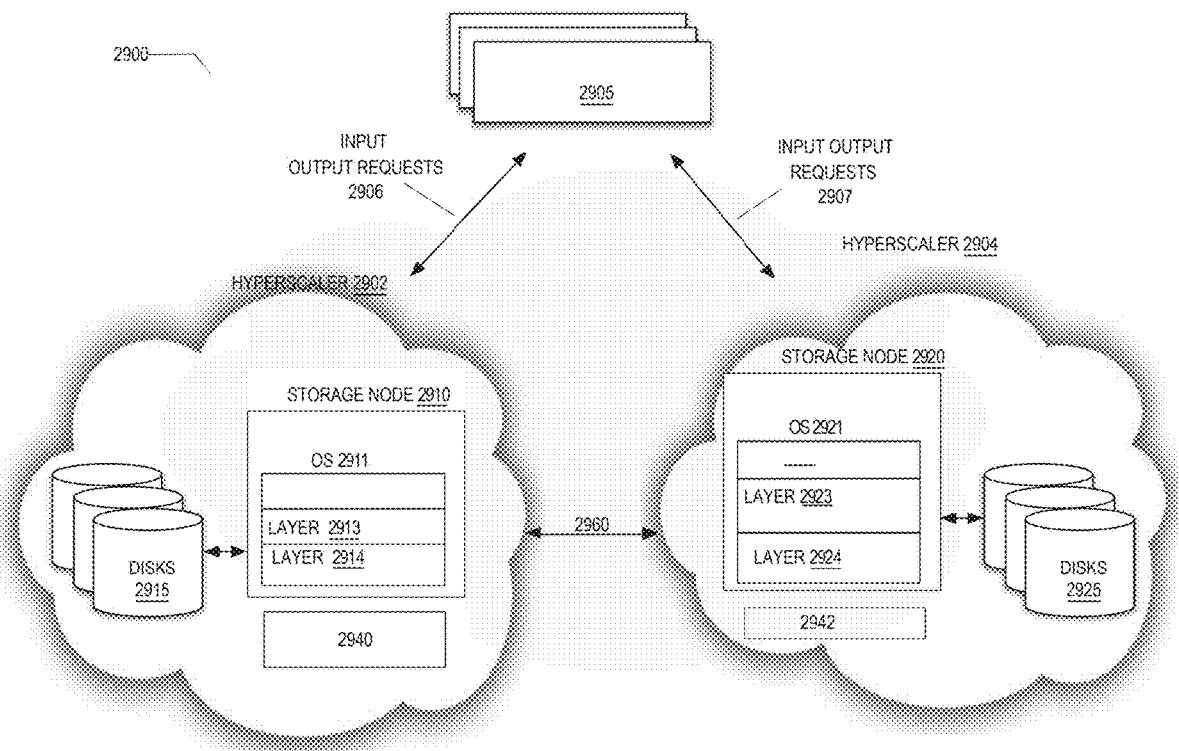
FIG. 14 is a block diagram illustrating a cloud environment in which various embodiments may be implemented (e.g., virtual storage nodes of a primary storage site, a secondary storage site, and a tertiary storage site).

FIG. 14 is a block diagram illustrating a cloud environment in which various embodiments may be implemented (e.g., virtual storage nodes of a primary storage site, a secondary storage site, and a tertiary storage site). In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having layers 2913 and 2914 of a protocol stack for processing of object storage protocol operations or requests.

The virtual storage node 2920 includes an operating system 2921, layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

What is claimed is:

1. A computer implemented method performed by one or more processing resources of a distributed storage system, the method comprising:

for each of a plurality of original volumes of a first storage node of a primary storage site of the distributed storage system that are members of a local consistency group (CG1), maintaining information indicative of whether a data replication relationship between a dataset associated with the CG1 and a mirror copy of the dataset stored on a corresponding plurality of original volumes that are members of a remote CG (CG2) of a second storage node of a remote secondary storage site is in an in-synchronization (InSync) state or an out-of-synchronization (OOS) state;

determining whether a CG storage expansion process is in progress including a source expansion to create a new source volume as a member of the CG1 and a destination expansion to create a new destination volume as a member of the CG2;

determining the OOS state for the data replication relationship between original volumes of the CG1 and original volumes of the CG2; and in response to determining the OOS state and whether the primary storage site has a failure, initiating and performing a dependent write order consistent automatic unplanned failover (AUFO) workflow without manual intervention to switch a primary role for serving input/output (I/O) operations for requesting devices from the original volumes in the CG1 of a first storage cluster of the primary storage site to the original volumes in the CG2 of a second storage cluster without including the new source volume and the new destination volume in the AUFO workflow when the CG storage expansion process is in progress with the new source volume to be a member of the CG1 and the new destination volume to be a member of the CG2.

2. The computer implemented method of claim 1, further comprising:

in response to determining the OOS state and whether the primary storage site has a failure, initiating an automatic unplanned (AUFO) failover workflow on all volumes in the CG1 of the first storage cluster and all volumes in the CG2 of the second storage cluster when the CG storage expansion process is completed with a new source volume having already been added as a member of CG1 and a new destination volume having been already added as a member of CG2.

3. The computer implemented method of claim 2, further comprising:

setting an indicator on any new volumes being added to CG1 or CG2 during the CG storage expansion process.

4. The computer implemented method of claim 1, further comprising:

modifying the CG2 of the second storage cluster to remove details of any new volumes being added to CG2 from a replicating database (RDB) table of the second storage cluster when the AUFO workflow has been initiated;

removing expand in progress state from the RDB table; and after the first storage cluster returns to operational state, modifying the CG1 of the first storage cluster to remove details of any new volumes being added to CG1 from a replicating database (RDB) table of the first storage cluster.

5. The computer implemented method of claim 1, further comprising:

initiating a data replication relationship from the original volumes of CG2 to the original volumes of CG1 while maintaining zero recover point objective (RPO) and Zero recover time objective (RTO).

6. The computer implemented method of claim 1, further comprising:

in response to an OOS state between the original volumes of CG1 and the original volumes of CG2, performing resynchronization between the original volumes of CG1 and the original volumes of CG2 while the CG storage expansion process is in progress.

7. The computer implemented method of claim 1, further comprising:

automatically resuming CG storage expansion if one or more failures occur during the CG storage expansion.

8. A non-transitory computer-readable storage medium embodying a set of instructions, which when executed by one or more processing resources of a distributed storage system, cause the distributed storage system to:

for each of a plurality of original volumes of a primary storage site of the distributed storage system that are members of a local consistency group (CG1), maintain information indicative of whether a data replication relationship between a dataset associated with the CG1 and a mirror copy of the dataset stored on a corresponding plurality of original volumes that are members of a remote CG (CG2) of a secondary storage site is in an in-synchronization (InSync) state or an out-of-synchronization (OOS) state;

determine whether a CG container expansion process is in progress including an existing source volume to be added as a member of the CG1;

determine the OOS state for the data replication relationship between original volumes of the CG1 and original volumes of the CG2; and in response to determining the OOS state and whether the primary storage site has a failure, initiate and perform an automatic unplanned failover (AUFO) workflow without manual intervention to switch a primary role for serving input/output (I/O) operations for requesting devices from the original volumes in the CG1 of a first storage cluster to the original volumes in the CG2 of a second storage cluster without including the existing source volume being added to CG1 in the AUFO workflow when the CG storage expansion process is in progress with the existing source volume to be added as a member of CG1.

9. The non-transitory computer-readable storage medium of claim 8, wherein the instructions further cause the distributed storage system to:

in response to determining the OOS state and whether the primary storage site has a failure, initiate an automatic unplanned failover (AUFO) workflow on all volumes in the CG1 of a first storage cluster and all volumes in the CG2 of a second storage cluster when the CG container expansion process is completed with the existing source volume having already been added as a member of CG1 and an existing destination volume having been already added as a member of CG2.

10. The non-transitory computer-readable storage medium of claim 9, wherein the instructions further cause the distributed storage system to:

set an indicator on any existing volumes being added to CG1 or CG2 during the CG container expansion process.

11. The non-transitory computer-readable storage medium of claim 9, wherein the instructions further cause the distributed storage system to:

modify the CG2 of the second storage cluster to remove details of any existing volumes being added to CG2 from a replicating database (RDB) table when the CG storage expansion process is in progress.

12. The non-transitory computer-readable storage medium of claim 11, wherein the instructions further cause the distributed storage system to:

remove container expand in progress state from the RDB table.

13. The non-transitory computer-readable storage medium of claim 8, wherein the instructions further cause the distributed storage system to:

initiate a data replication relationship from the original volumes of CG2 to the original volumes of CG1 while maintaining zero recover point objective (RPO) and Zero recover time objective (RTO).

14. The non-transitory computer-readable storage medium of claim 8, wherein the instructions further cause the distributed storage system to:

in response to an OOS state between the original volumes of CG1 and the original volumes of CG2, perform resynchronization between the original volumes of CG1 and the original volumes of CG2 while the CG container expansion process is in progress.

15. The non-transitory computer-readable storage medium of claim 8, wherein the instructions further cause the distributed storage system to:

automatically resume CG container expansion if one or more failures occur during the CG storage expansion.

16. A distributed storage system comprising:

one or more processing resource; and one or more non-transitory computer-readable media, coupled to the one or more processing resources, having stored therein instructions that when executed by the one or more processing resource cause the distributed storage system to:

for each of a plurality of original volumes of a primary storage site of the distributed storage system that are members of a local consistency group (CG1), maintain information indicative of whether a data replication relationship between a dataset associated with the CG1 and a mirror copy of the dataset stored on a corresponding plurality of original volumes that are members of a remote CG (CG2) of a remote secondary storage site is in an in-synchronization (InSync) state or an out-of-synchronization (OOS) state;

determine whether a CG storage expansion process is in progress with a new source volume to be added as a member of CG1 and a new destination volume to be added as a member of CG2;

in response to determining the OOS state and whether the primary storage site has a failure, automatically resume CG storage expansion without manual intervention when the CG storage expansion process has a failure before completing.

17. The distributed storage system of claim 16, wherein the instructions further cause the distributed storage system to in response to determining the OOS state and whether the primary storage site has a failure, initiate and perform an unplanned failover workflow on all volumes in the CG1 of a first storage cluster and all volumes in the CG2 of a second storage cluster when the CG storage expansion process is completed with a new source volume having already been added as a member of CG1 and a new destination volume having been already added as a member of CG2.

18. The distributed storage system of claim 16, wherein the instructions further cause the distributed storage system to set an indicator on any new volumes being added to CG1 or CG2 during the CG storage expansion process.

19. The distributed storage system distributed storage system of claim 16, wherein the instructions further cause the distributed storage system to initiate a data replication relationship from the original volumes of CG2 to the original volumes of CG1 while maintaining zero recover point objective (RPO) and Zero recover time objective (RTO).

20. The distributed storage system of claim 16, wherein the instructions further cause the distributed storage system to in response to an OOS state between the original volumes of CG1 and the original volumes of CG2, performing resynchronization between the original volumes of CG1 and the original volumes of CG2 while the CG storage expansion process is in progress.

* * * * *